(12) United States Patent
Linder (10) Patent No.: US 12,202,035 B2
(45) Date of Patent: Jan. 21, 2025

(54) METHOD AND ARRANGEMENT FOR CRACK REMOVAL

(71) Applicant: ABB Schweiz AG, Baden (CH)

(72) Inventor: Sten Linder, Trosa (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/001,895

(22) PCT Filed: Jun. 14, 2021

(86) PCT No.: PCT/EP2021/065994
§ 371 (c)(1),
(2) Date: Dec. 15, 2022

(87) PCT Pub. No.: WO2021/254971
PCT Pub. Date: Dec. 23, 2021

(65) Prior Publication Data
US 2023/0191477 A1    Jun. 22, 2023

(30) Foreign Application Priority Data
Jun. 16, 2020   (EP) ..................................... 20180393

(51) Int. Cl.
*B22D 11/16*   (2006.01)
*B22D 11/12*   (2006.01)

(52) U.S. Cl.
CPC ............ *B22D 11/16* (2013.01); *B22D 11/122* (2013.01)

(58) Field of Classification Search
CPC .......... B23K 7/06; B22D 11/122; B22D 11/16
See application file for complete search history.

(56) References Cited

U.S. PATENT DOCUMENTS

| 4,131,490 A | 12/1978 | Oishi et al. |
| 4,318,439 A | 3/1982 | Hiroshima et al. |
| 4,373,969 A * | 2/1983 | Donze ..................... F23D 14/56 148/202 |

FOREIGN PATENT DOCUMENTS

| CN | 101389428 A | 3/2009 |
| CN | 102791401 A | 11/2012 |
| DE | 2904951 A1 | 5/1981 |
| EP | 1980345 A1 | 10/2008 |

(Continued)

OTHER PUBLICATIONS

Chinese Office Action; Application No. 202180041389.2; Completed May 30, 2023; 9 Pages.

(Continued)

*Primary Examiner* — Kevin E Yoon
*Assistant Examiner* — Jacky Yuen
(74) *Attorney, Agent, or Firm* — Whitmyer IP Group LLC (57) ABSTRACT

A method of removing a crack in a metallic material during a metal making process. The method including: determining the presence of a crack and its crack depth during the metal making process by a crack detecting unit utilizing inductive measurement, sending a crack detection signal and crack depth to a crack removal unit arranged on known distance from the crack detecting unit, the crack removal unit including an ejector configured to eject a carving means, and to vary the intensity of the ejected carving means, removing the detected crack by activating the ejector based on the crack detection signal with an intensity of the ejected carving means based at least on the crack depth.

19 Claims, 4 Drawing Sheets

(56) References Cited

FOREIGN PATENT DOCUMENTS

| | | | |
|---|---|---|---|
| EP | 2535125 | A2 | 12/2012 |
| EP | 2574911 | A1 | 4/2013 |
| GB | 853088 | A | 11/1960 |
| GB | 2036375 | A | 6/1980 |
| JP | 51009048 | B1 | 1/1976 |
| JP | 52134487 | A | 11/1977 |
| JP | 52139648 | A | 11/1977 |
| JP | S53040636 | A | 4/1978 |
| JP | 53109840 | A | 9/1978 |
| JP | 59104545 | A | 6/1984 |
| JP | 60184456 | U | 12/1985 |
| JP | 02-163645 | A * | 6/1990 |
| JP | 05008031 | A | 1/1993 |
| JP | 10263770 | A | 10/1998 |
| JP | 2008238259 | A | 10/2008 |
| JP | 2013520319 | A | 6/2013 |
| KR | 1020110092101 | A | 8/2011 |
| KR | 101981456 | B1 | 5/2019 |
| WO | 200748255 | A1 | 5/2007 |
| WO | 2021019810 | A1 | 2/2021 |
| WO | 2021173927 | A1 | 9/2021 |

OTHER PUBLICATIONS

Korean Notice of Preliminary Rejection; Application No. 10-2023-7000332; Completed: May 2, 2023; 19 Pages.
Extended European Search Report; Application No. 20180393.9; Completed: Dec. 1, 2020; Issued: Dec. 10, 2020; 15 Pages.
International Preliminary Report on Patentability; Application No. PCT/EP2021/065994; Issued: Oct. 14, 2022; 20 Pages.
International Search Report and Written Opinion of the International Searching Authority; Application No. PCT/EP2021/065994; Completed: Sep. 17, 2021; Mailing Date: Sep. 27, 2021; 16 Pages.
Written Opinion of the International Preliminary Examining Authority; Application No. PCT/EP2021/065994; Issued: May 18, 2022; 8 Pages.
Indian Office Action; Application No. 202347001256; Mailed: Jan. 18, 2023; 6 Pages.
Japanese Office Action; Application No. JPH2022576142; Completed: Jun. 2, 2023; Mailing Date: Jun. 6, 2023; 6 Pages.

* cited by examiner

METHOD AND ARRANGEMENT FOR CRACK REMOVAL

TECHNICAL FIELD

The present disclosure generally relates to removal of cracks in a metallic material, and in particular to crack removal during a metal making process, such as e.g. casting.

BACKGROUND

Methods to remove cracks from an object of a metallic material, such as e.g. a metal sheet or metal slab, are used in industry today. Generally, a portion of the metal object around the crack is removed to create a ditch instead of a crack. The ditch causes, in contrary to a crack, no, or at least fewer problems in following processing of the metal object. This is, for instance, the case when a metal slab after the crack removal is rolled to reduce the thickness of the metal slab. The removal of a portion of the metallic material can for instance be carried out by grinding the metal object or by melting the metallic material with an e.g., a gas burner.

It is a commonly used procedure to remove observed cracks on cold metal objects in this way. First, the metal object is produced in a metal making process, e.g. casting in a casting machine or caster, and thereafter cooled to room temperature, often during several days. Subsequently, the metal object is visually inspected for crack, a procedure in which normally only large, open, cracks are found. The metal object may e.g., be irradiated by light wherein a crack may be detected by means of an optical sensor such as a camera. However, such optical methods typically only detect cracks which are visible on the surface of the metallic material, and colour variations in the metallic material may be interpreted as cracks by the optical sensor. Thus, the surface of the metal object typically needs to be completely clean and smooth. A visually, or optically, detected crack can then be removed to adequate depth by following the removal process as exemplified above.

In EP2535125 a slab processing method and a slab processing which can manufacture hot rolled steel plates are disclosed. The slab processing method comprises the steps of: preparing a slab for processing; scarfing the edge regions of the slab prior to cooling the slab to a temperature below 600° C., and post-processing the slab.

There are still drawbacks of the current crack removal procedures, and thus a need in the industry for providing an improved method and arrangement for crack removal in an object of a metallic material.

SUMMARY

An object of the present invention is to overcome at least some of the above problems, and to provide a solution for removing cracks during a metal making process, which at least to some extent, is improved compared to prior art solutions. This, and other objectives, which will become apparent in the following are accomplished by means of a method and an arrangement for removing a crack in a metallic material during a metal making process.

According to a first aspect of the present invention, a method of removing a crack in a metallic material during a metal making process is provided. The method comprising the steps of:

determining the presence of a crack and its crack depth during the metal making process by a crack detecting unit utilizing inductive measurement, sending a crack detection signal and crack depth to a crack removal unit arranged at a known distance from the crack detecting unit, the crack removal unit comprising an ejector configured to eject a carving means, and to vary the intensity of the ejected carving means, and removing the detected crack by activating the ejector based on the crack detection signal with an intensity of the ejected carving means based at least on the crack depth.

Hereby, a crack can be efficiently removed during the metal making process, e.g. during casting, without the need to cool down the metallic material. Moreover, as the crack depth is used as input to determine the intensity at which the ejector ejects the carving means, a sufficient, but not excessive, amount of carving means is ejected to remove the crack by e.g., causing a ditch in the metallic material. Thus, the ejector is configured to vary the intensity of the ejected carving means using the crack depth as input to determine the set intensity. Furthermore, by both detecting the presence of a crack and its crack depth during the metal making process, and removing the detected crack based on the detection of the crack during the metal making process, in combination with arranging the crack removal unit at a known distance from the crack detecting unit, an efficient means for removing the crack is provided. In other words, the crack detecting unit and the crack removal unit are operating in a continuous and synchronized manner to detect and remove a crack during the metal making process.

Thus, according to at least one example embodiment, the crack depth is used as input to determine the intensity of which the ejector eject the carving means. Stated differently, the intensity of the ejected carving means is adapted in response to the crack depth. The crack depth being the determined crack depth of the determined crack. In other words, as the ejector is configured to vary the intensity of the ejected carving means, it is configured to vary the intensity of the ejected carving means in response to the crack depth. Hereby, the ejector adapts the ejected carving means in such a way that it carves into the metallic material at the detected crack to a depth corresponding to that of the determined crack depth. This procedure is repeated for subsequently detected cracks. Thus, the ejector varies the intensity of the ejected carving means in response to the respective crack depth for subsequently detected cracks. Thus for two subsequently detected cracks, a first crack having a first crack depth and a second crack having a second crack depth, the second crack depth being larger than the first crack depth, the ejector varies, or adapts, the intensity of the ejected carving means in response to the first crack depth when removing the first crack, and subsequently varies, or adapts, the intensity of the ejected carving means in response to the second crack depth when removing the second crack, the intensity of the ejected carving means when removing the second crack being larger than the intensity of the ejected carving means when removing the first crack.

During the metal making process should be understood as during the process of producing a metallic material object, i.e. typically after the metallic material has been discharged from the metal making machine, e.g. a casting machine, or mold, for a casting process, but prior to cooling the metallic material. Thus, the metal making process may be referred to a hot metal making process, in which hot indicates a temperature of the metallic material of at least 500° C., or at least 750° C. Typically, the method is carried out at the discharge of metallic material from a continuous casting machine, i.e. on the hot slab. During the metal making process is sometimes referred to as during operation in the following. The metallic material of the present disclosure may be referred to as a metal object, hot metal object, metal slab, metal sheet, hot metal slab or hot metal sheet.

According to at least one example embodiment, the step of determining the presence of a crack and its crack depth is carried out in a contactless manner with the metallic material. The crack detecting unit may e.g., comprise a transmitter coil arranged and configured to generate a magnetic field in the metallic material and at least a first receiver coil arranged and configured to detect the magnetic field. Thus, the known distance between the crack detecting unit and the crack removal unit may e.g., be a distance between the transmitter coil or receiver coil and the ejector. In more detail, when using an inductive measurement technique for detecting a crack, a current is induced in the metallic material, e.g. the metal sheet or metal slab, by means of a time-varying magnetic field generated by the transmitter coil resulting from a feed of a corresponding time-varying current. When the induced current encounters a crack in the metallic material, the crack constitutes an obstacle to the induced current. As a result, the crack alters the induced current at the crack as compared to a metallic material without a crack. The altered current provides a change in the magnetic field around the current. The change in the magnetic field is measured by the receiver coil, whereby it can be determined that a crack is present in the inspected portion of the metallic material by e.g., comparing with known reference data. Such crack detecting unit is explained in detail further below.

According to at least one example embodiment, the activation of the ejector to remove the detected crack is based on an elapsed time from the crack detection of the crack detection unit, determined by the speed of the metallic material and the distance between the crack detecting unit and the crack removal unit.

Hereby a correct timing of the activation of the ejector in order to remove the detected crack is achieved. The elapsed time may e.g., be between 10 seconds and 100 seconds. For example, the speed of the metallic material may be approximately 2 cm/s and the distance between the crack detecting unit and the crack removal unit between 0.5 m and 1 m. Alternatively the speed of the metallic material is faster, and the elapsed time may lower, e.g. below 10 seconds, such as e.g. below 5 seconds or below 2 seconds. Thus, the ejector is activated to locally remove the crack. That is, the crack is removed without carving an unnecessary large portion of, or ditch in, the metallic material. Typically, as soon as the crack has been removed by means of the ejector and the ejected carving means to a depth corresponding to the crack depth, the ejector is deactivated. The time of keeping the ejector activated is e.g. adapted to the length of the determined crack, the length of the crack e.g. be estimated, or determined as described later. Typically, the width of a crack is small compared to the length and/or the crack depth, and the ejector will typically be configured to eject the ejected carving means by a width corresponding to the at least the width of the crack.

Thus, according to at least one example embodiment, the step of removing the detected crack by activating the ejector based on the crack detection signal with an intensity of the ejected carving means based at least on the crack depth, is performed to locally remove the detected crack. Thus, a portion comprising the detected crack of the metallic material is carved by the ejected carving means. In other words, the crack and the closest surrounding metallic material are removed by the ejected carving means.

Typically, the crack detecting unit and the crack removal unit are, during operation, arranged to encounter the same spot of the metallic material successively. In other words, crack detection and crack removal are carried out in continuous and successive manner.

According to at least one example embodiment, the method comprises the step of arranging the crack detecting unit and the crack removal unit along the same operational line of the metallic material. Thus, the crack detecting unit and the crack removal unit are arranged along the same operational line, and are configured to, during operation, encounter the metallic material in a corresponding manner. For example, the detecting area, or detecting width, of the crack detecting unit corresponds to a crack removal area, or crack removal width, of the crack removal unit. Thus, a crack detected by the crack detecting unit will, as the metallic material travels along its operation path, be encountered by the crack removal unit. Stated differently, the crack removal unit may be arranged along the same longitudinal axis, the longitudinal axis being parallel to the main direction of movement of the metallic material. According to at least one example embodiment, the metallic material may be divided into different zones extending transversally over the metallic material (i.e. perpendicular to the longitudinal axis in the same horizontal plane as the surface of the metallic material), wherein each zone comprises a crack detecting unit and a crack removal unit. Moreover, by keeping the same operational line for the crack detecting unit and the crack removal unit, transversal movements may be avoided. For a hot metallic material, avoidance of transversal movements is preferred as this may cause problems with cooling. Alternatively, the crack detecting unit and the crack removal unit comprises means for moving transversally along the metallic material. For such embodiments, once a crack is detected, the transversal movement of the crack detecting unit and the crack removal unit is typically stopped, so as to enable the crack removal unit to operate along the same longitudinal axis in which the crack was detected.

According to at least one example embodiment, the method further comprises the step of determining a first distance between the ejector and the surface of the metallic material, and wherein the step of removing the detected crack during the metal making process comprises setting the intensity of the ejected carving means based at least on the crack depth and said first distance.

Hereby, also the first distance between the ejector and the surface of the metallic material can be taken as input to determine the intensity at which the ejector ejects the carving means. Thus, an improved accuracy and/or improved efficiency of the crack removal is provided.

It should be understood that the surface of the metallic material is typically arranged in a horizontal plane, and the distance from a surface of the metallic material relative the crack detecting unit (e.g. the transmitter coil and/or receiver coil) or crack removal unit (e.g. the ejector) is a vertical distance perpendicular to the horizontal plane. The crack detecting unit and the crack removal unit are thus arranged at a distance from each other along an axis parallel to the horizontal plane (i.e. a horizontal distance) and are both arranged at a vertical distance from the surface of the metallic material. Thus, the first distance is a vertical distance.

According to at least one example embodiment, the first distance is based on a measured distance between the crack detecting unit, e.g. the receiver coil of the crack detecting unit, and the surface of the metallic material. Based on the measured distance, and known inter-related positions of e.g.

the receiver coil and the ejector (or an orifice of the ejector), the first distance is determined. The measured distance may e.g., be based on an integrated signal from the receiver coil over a certain time interval.

According to at least one example embodiment, the method further comprises the step of adapting the first distance between the surface of the metallic material and the ejector of the crack removal unit.

Hereby, the ejector can be arranged at a beneficial distance from the surface of the metallic material. Moreover, the required intensity of the ejected carving means can be adapted by adapting the first distance. The ejector and the crack removal unit may be arranged and configured to move in unison, and thus, when moving the ejector by adapting the first distance between the surface of the metallic material and the ejector, the crack removal unit moves. Even further, if problems arise during operation, the ejector and/or crack removal unit may quickly be moved away from the metallic material. Correspondingly, the crack detecting unit may be moved away from the metallic material.

According to at least one example embodiment, the method further comprises the step of keeping the first distance constant during operation of the crack removal unit.

This may e.g., be achieved by some position adjusting means operating in response to the measured distance between the crack detecting unit and the surface of the metallic material.

According to at least one example embodiment, the method comprises the step of keeping the distance between the crack detecting unit and crack removal unit constant during the process of crack removal.

That is, a horizontal distance between the crack detecting unit and crack removal unit being constant. Thus, removal of the crack, and specifically the timing of the crack removal, is facilitated as the known distance between the crack detecting unit and crack removal unit is constant.

According to at least one example embodiment, the crack detecting unit and the crack removal unit are arranged in close proximity to each other, and/or are configured to move equally relative the metallic material.

The crack detecting unit may e.g., be coupled or rigidly connected to the crack removal unit, possibly by sharing a common platform.

According to at least one example embodiment, the crack removal unit is arranged movably together with the crack detecting unit.

According to at least one example embodiment, the method further comprises the step of providing the crack detecting unit partly outside of the edge of the metallic material for detecting a crack and its crack depth at the edge.

Hereby, cracks and their respective crack depth at the edge of the metallic material can be detected. For such embodiment, also the crack removal unit is arranged close to the edge in order to remove any detected crack (e.g., by partly overlapping the edge). Typically, the transmitter coil of the crack detecting unit is provided at least partly outside of the edge of the metallic material. According to at least one example embodiment, the crack detecting unit, e.g. the transmitter coil, is provided at least partly inside of the edge. Thus, the crack detecting unit, such as e.g. the transmitter coil, is provided to overlap the edge for detecting a crack and its crack depth at the edge.

According to at least one example embodiment, the method comprises the step of determining the position of the edge relative a reference position, and adjusting the position of the crack detecting unit and the crack removal unit to keep the relative distance between the edge and the crack detecting unit, and the distance between the edge and the crack removal unit constant during the process of crack removal.

Hereby, the process of removing cracks at the edges of the metallic material is improved. The reference position may be any position within the crack detecting unit (or crack removal unit) or any platform to which it is arranged. For example, the reference position is the receiver coil, or a magnetic centre (or horizontal centre axis) of the receiver coil.

According to at least one example embodiment, the ejector is a burner and the ejected carving means is a flame, the method further comprising the step adjusting the intensity of the flame by controlling a gas supply feed to the burner.

Hereby, a simple but yet effective means for removing the crack is provided. The flame will typically carve, or melt, the material around the crack, causing a ditch in the metallic material. However, it should be understood that the ejector may be configured differently, e.g. to eject a jet flame or an oxygen jet. Intensity of the carving means may thus be understood as strength, power, or extension relative the ejector, of the carving means. For a flame, the intensity may e.g., be related to the size of the flame.

According to a second aspect of the present invention, an arrangement for removing a crack in a metallic material during the metal making process is provided. The arrangement comprises:

a crack detecting unit comprising a transmitter coil and at least one receiver coil, a crack removal unit arranged at a known distance from the crack detecting unit, the crack removal unit comprising at least one ejector configured to eject a carving means and to vary the intensity of the ejected carving means, a control unit configured to feed a current to the transmitter coil according to a known schema for generating a magnetic field in the metallic material, detect the magnetic field by means of the receiver coil to generate a signal, and process the generated signal to establish the presence of a crack and its crack depth, wherein upon detection of a crack during the metal making process, the control unit is configured to send a crack detection signal and crack depth to the crack removal unit for activating the ejector to remove the crack, and setting the intensity of the ejected carving means based on at least the crack depth.

Effects and features of the second aspect of the invention are largely analogous to those described above in connection with the first aspect of the invention. Embodiments mentioned in relation to the first aspect of the invention are largely compatible with the second aspect of the invention, of which some are exemplified below. The known schema for generating a magnetic field in the metallic material which the control unit is configured to operate the transmitter coil by, is e.g. achieved by controlling a time-varying current.

According to at least one example embodiment, the control unit is configured to calculate timing of the activation of the ejector based on an elapsed time from the crack detection of the crack detection unit, determined by the speed of the metallic material and the distance between the crack detecting unit and the crack removal unit.

As mentioned in relation to the first aspect of the invention, the crack detecting unit and the crack removal unit are typically arranged along the same operational line (or longitudinal axis), and are configured to, during operation, encounter the metallic material in a corresponding manner.

Thus, knowing the distance between the crack detecting unit and the crack removal unit, e.g. between the transmitter coil or receiver coil and the ejector, and the speed of the metallic material, the timing of the crack removal by the crack removal unit can be set in relation to crack detection by the crack detecting unit.

According to at least one example embodiment, the control unit is configured to determine a first distance between the ejector and the surface of the metallic material, and setting the intensity of the ejected carving means based at least on the crack depth and said first distance.

The first distance may be based on a distance measured by the crack detecting unit as described with reference to the first aspect of the invention.

According to at least one example embodiment, the arrangement further comprising a position adjusting arrangement configured to adjust the position of the crack detecting unit and/or the crack removal unit in relation to the metallic material.

The position adjusting arrangement may be configured to adjust the position both vertically and horizontally relative the metallic material or surface thereof. For example, the position adjusting arrangement may comprise at least one motor-driven actuator for adapting the distance between the surface of the metallic material and the ejector of the crack removal unit. The position adjusting arrangement may be configured to adjust the position both vertically and horizontally relative the metallic material in order to keep the position relative the metallic material constant.

According to at least one example embodiment, the crack detecting unit and the crack removal unit is sharing a common platform.

Hereby, the operation of crack removal is facilitated. By using a platform, the distance between the crack detecting unit, and any components thereof, and the crack removal unit, and any components thereof, will be kept known and constant. Moreover, by the platform, the crack removal unit is arranged movably together with the crack detecting unit.

According to at least one example embodiment, the crack detecting unit is configured to be arranged such that transmitter coil is arranged partly outside of an edge of the metallic material, for enabling detection of a crack and its crack depth at the edge.

As described in relation to the first aspect of the invention, the transmitter coil may be configured to be arranged at least partly outside and at least partly inside of the edge of the metallic material, such that, in operation, the transmitter coil overlaps the edge to enable detection of a crack and its crack depth at the edge. As also mentioned in relation to the first aspect of the present invention, the crack removal unit may be correspondingly configured and arranged to remove cracks at the edge of the metallic material, e.g. by being configured to be arranged to overlap the edge during operation.

According to at least one example embodiment, the control unit is configured to determine the position of the edge relative a reference position.

The reference position may be the same reference position as previously described.

The control unit may be configured to adjust the position of the crack detecting unit and the crack removal unit to keep the relative distance between the edge and the crack detecting unit, and the distance between the edge and the crack removal unit constant.

According to at least one example embodiment, said receiver coil is a first receiver coil, and the arrangement further comprises a second receiver coil arranged and configured to detect the magnetic field caused by the transmitter coil, wherein the control unit, or a computing arrangement of the control unit, is further configured to receive a signal created by the magnetic field detected by the second receiver coil. The control unit may be further configured to determine the position of the edge and the distance from the surface of the metallic material, relative the first and second receiver coils, respectively. In more detail, the first receiver coil is configured to be arranged relatively close the to the edge, e.g. at least partly overlapping the edge, why an integrated signal value from the first receiver coil over a time range will depend on both the vertical distance between the first receiver coil and the surface of the metallic material, as well as the horizontal distance between the first receiver coil (e.g. a magnetic centre or horizontal centre axis) and the edge. The second receiver coil is on the other hand configured to be arranged at a distance from the first receiver coil, typically distant from the edge, why an integrated signal value from the second receiver coil over the same time range will depend only on the vertical distance between the second receiver coil and the surface of the metallic material.

Hereby, the coil arrangement (i.e. the transmitter coil, and the first and second receiver coils) and its distance relative the edge and the surface of the metallic material can be determined. Such position information can be used e.g. in combination with the position adjusting arrangement configured to horizontally and vertically re-position the coil arrangement, in order to e.g. keep a constant distance between the coil arrangement and the edge, and between the coil arrangement and the surface of the metallic material, respectively.

According to at least one example embodiment, the ejector is a burner configured to eject a flame as carving means, and a varying gas supply feed to the burner for varying the intensity of the flame.

Effects and embodiments of the ejector mentioned in relation to the first aspect of the invention is applicable to the second aspect of the invention as well. The operating of the ejector is typically controlled by the control unit.

Now, embodiments of the crack detecting unit will be described in more detail. For example, the crack detecting unit may be configured as in EP2574911A1 according to the following method and arrangement. The crack detecting unit comprising a transmitter coil and a receiver coil. The method comprising:

feeding a current with a first magnitude to the transmitter coil for generating a magnetic field in the metallic material, controlling the current such that it obtains a second magnitude when the magnetic field is estimated to have penetrated deeper than a deepest crack depth desired to be measured in the metallic material, detecting the magnetic field by means of the receiver coil, which detected magnetic field thereby generates a signal in the receiver coil, determining a first characteristic value of the signal in a first-time range, the first time range starting at a time:
at which it has been estimated that any disturbances due to control of the current to obtain the second magnitude have ceased, and
optionally, at a current induced in the metallic material due to control of the current to obtain the second magnitude has penetrated deeper in the metallic material than a depth corresponding to surface irregularities of the metallic material and crack depths not desired to be measured, the first-time range ending when the current induced in the metallic material due to control of the current to obtain the second magnitude has penetrated to a depth in the metallic material corresponding to a deepest crack depth desired to be measured, determining a second characteristic value of the signal in a second time range after the first-time range, and determining a possible presence of a crack and its crack depth based on the first characteristic value and the second characteristic value.

By determining the first characteristic value and the second characteristic value according to the above specified time ranges, a crack depth may be determined independently without having other process parameters affecting the determined crack depth value. Hence reliable crack depth measurements may be provided.

In one embodiment, in the step of feeding, the current is essentially constant. In one embodiment the estimation of the magnetic field having penetrated deeper than a deepest crack depth desired to be measured in the metallic material is based on when the feeding the current to the transmitter coil starts, a deepest crack depth desired to be measured and the relative permeability and electrical resistivity of the metallic material. In one embodiment the start of the first-time range is estimated based on a time when control of the current to obtain its second magnitude starts and on a relation between the relative permeability and electrical resistivity of the metallic material. In one embodiment the end of the first-time range is estimated based on the time when the current obtains its second magnitude, the deepest crack depth desired to be measured and the relative permeability and electrical resistivity of the metallic material. In one embodiment the step of determining the first characteristic value comprises integrating the signal during the first-time range. In one embodiment the step of determining the second characteristic value comprises integrating the signal during the second time range. In one embodiment the step of determining a possible presence of a crack and its crack depth involves determining a relation between the first characteristic value and the second characteristic value.

One embodiment comprises determining a third characteristic value of the signal in a third time range, the third time range starting simultaneously with the first time range and ending at a time which is determined based on the start of the first time range and the end of the first time range, wherein the step of determining comprises determining a crack length of a possible crack based on the first characteristic value, the second characteristic value and the third characteristic value. By determining a third characteristic value as specified above, crack depth of a crack having a shorter extension than the extension of the receiver coil in a plane parallel with the surface of the metallic material to be inspected may be determined. Moreover, the third characteristic value also provides sufficient information together with the first characteristic value and the second characteristic value to be able to determine the crack length. In one embodiment the step of determining the third characteristic value comprises integrating the signal during the third time range.

The crack detecting unit may be configured as in EP2574911A1 according to the following arrangement. The arrangement comprises: a transmitter coil arranged and configured to generate a magnetic field in the metallic material; a receiver coil arranged and configured to detect the magnetic field; a signal generator configured to feed a current having a first magnitude to the transmitter coil for generating the magnetic field in the metallic material; a control unit configured to control the signal generator such that the current obtains a second magnitude when the magnetic field is estimated to have penetrated deeper than a deepest crack depth desired to be measured in the metallic material; and a computing arrangement configured to receive a signal created by the magnetic field detected by the receiver coil, and to determine a first characteristic value of the signal in a first time range, the first time range starting at a time:

at which it has been estimated that any disturbances due to control of the current to obtain the second magnitude have ceased, and optionally a current induced in the metallic material due to control of the current to obtain the second magnitude has penetrated deeper in the metallic material than a depth corresponding to surface irregularities of the metallic material and crack depths not desired to be measured, the first time range ending after the current induced in the metallic material due to control of the current to obtain the second magnitude has penetrated to a depth in the metallic material corresponding to a deepest crack depth desired to be measured, the computing arrangement being further configured to determine a second characteristic value of the signal in a second time range after the first time range, and to determine a possible presence of a crack and its crack depth based on the first characteristic value and the second characteristic value.

In one embodiment the computing arrangement is configured to determine a third characteristic value of the signal in a third time range, the third time range starting simultaneously with the first time range and ending at a time which is determined based on the start of the first time range and the end of the first time range, and to determine a crack length of a possible crack based on the first characteristic value, the second characteristic value and the third characteristic value.

The specific details of the method and arrangement of EP2574911A1 is provided in the detailed description thereof, and specifically reference is made to the theory and estimations of various time ranges or time spans, e.g. t1-t0, t12-t11, t14-t13, t11-t1, t11-t17 and corresponding points in time, as well as the first, second and third characteristic values CV1, CV2, CV3 and their relation to determine e.g. crack depth CD and crack length, which may be utilized in combination with the disclosure presented here, using the same components.

Thus, according to at least one example embodiment, the step of determining the presence of a crack and crack depth may comprise comparing the inductive measurements with reference data. For example, measurement signal(s) of the crack detecting unit is processed in the control unit or computing arrangement for comparison with reference values of the same metallic material without cracks, in order to determine whether a crack is present in that portion of the metallic material or not.

Moreover, the control unit or computing arrangement may be used to, for example, determine the first distance by the measured distance of the crack detecting unit. This may be carried out in an integration unit of the computing arrangement, in which an induced voltage in the receiver coil is integrated from e.g. the moment when the control signal commands the current to the transmitter coil to obtain the second magnitude (by e.g. turning off the current through the transmitter coil) and to a fixed time thereafter (typically to a time when any disturbances due to control of the current to obtain the second magnitude have ceased). This integrated value may be used to calculate the distance between the receiver coil and the surface of the metallic material, largely independent from influences from the material.

The arrangement of the present disclosure may additionally, or alternatively be used to detect and remove a crack at an edge of the metallic material. Such crack detecting unit comprises a transmitter coil and at least one receiver coil. According to such embodiments, the method for determining the crack at the edge of a metallic material may be performed as described in the following:

feeding a current with a first magnitude to the transmitter coil for generating a magnetic field in the metallic material, controlling the current such that it obtains a second magnitude when the magnetic field is estimated to have penetrated deeper than a deepest crack depth desired to be measured in the metallic material, detecting the magnetic field by means of the receiver coil, which detected magnetic field thereby generates a signal in the receiver coil, determining a first signal value of the signal at a first time at which it has been estimated that any disturbances due to control of the current to obtain the second magnitude have ceased, and determining a second signal value of the signal at a second time after the first time, and determining a third signal value of the signal at a third time after the second time, and determining a possible presence of a crack and its crack depth based on the first, second and third signal values by means of determining a characteristic relation between at least two of the following combinations of signal values: the first signal value and the second signal value; the second signal value and the third signal value; and the first signal value and the third signal value, wherein the characteristic relation between the least two combinations of signal values are independent of the position of the edge and the radius of the curvature of the edge. By determining characteristic relation between the least two combinations of signal values according to the above specified time, a crack depth may be determined independently of the position of the edge and the radius of the curvature of the edge, without having other process parameters affecting the determined crack depth value. Thus, it should be understood that the characteristic relation between the least two combinations of signal values are independent of the position of the edge and the radius of the curvature of the edge. Hence reliable crack depth measurements may be provided at the edge of the metallic material.

More details of such measurement method are described with reference to FIGS. 2a, 2b, 3a and 3b in the detailed description below.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

These and other aspects of the present inventive concept will now be described in more detail, with reference to the appended drawings showing an example embodiment of the inventive concept, wherein.

DETAILED DESCRIPTION

In the following description, for purposes of explanation and not limitation, specific details are set forth such as particular components, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The arrangements presented herein is adapted to detect cracks in a metallic material object by determining the crack depth of a crack, and to successively remove the crack during a metal making process. The arrangement may in some embodiments also be able to determine the crack length. The arrangement is adapted to be used under extreme conditions in a (hot) metal making process such as a casting process or a rolling process. The arrangement may in particular be used for removal of a crack to the measured crack depth on rough metallic surfaces.

Any metallic material which has a conductivity which is high enough to allow a current to be induced in the metallic material may be subject to the methods and arrangements presented herein. Such material is e.g. steel, or hot steel.

Figure 1:
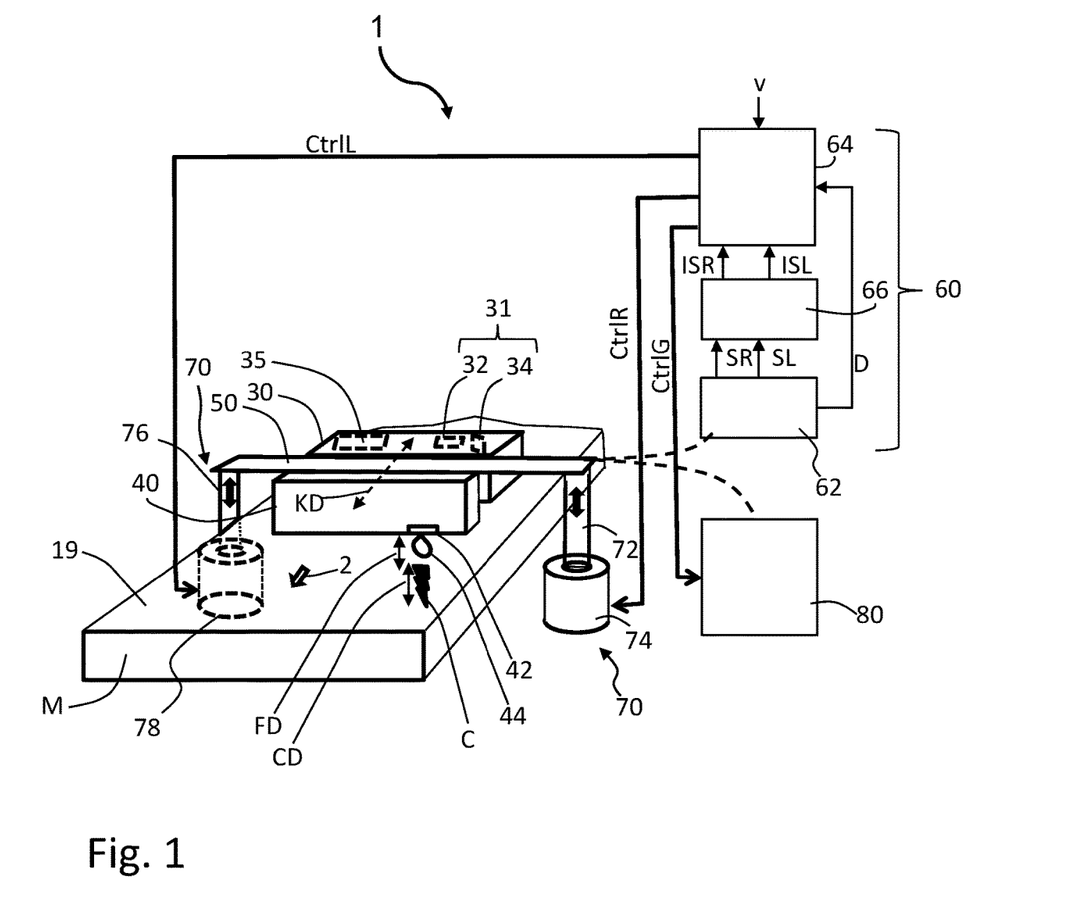
FIG. 1 is a schematic view of an example of an arrangement for removing a crack in a metallic material during the metal making process.

FIG. 1 shows a perspective view of an arrangement 1 for removing a crack in a metallic material M during a hot metal making process, such as casting, and a complementary schematic view of the control unit and signal handling for operating the arrangement 1. Arrangement 1 comprises a crack detecting unit 30 comprising a coil arrangement 31 (only shown schematically in FIG. 1, and described in greater detail with reference to FIGS. 2a and 2b) of a transmitter coil 32 and a receiver coil 34, for determining the presence of cracks and their respective crack depth utilizing inductive measurements, and a crack removal unit 40 arranged at a known distance KD from the crack detecting unit 30. The crack removal unit 40 comprises at least one ejector 42 configured to eject a carving means 44. In the example embodiment of FIG. 1, the crack detecting unit 30 and the crack removal unit 40 are arranged on a common platform 50. The arrangement 1 further comprises a control unit 60 configured to control the operation of the arrangement 1, and a position adjusting arrangement 70 configured to adjust the position of the crack detecting unit 30 and the crack removal unit 40 by varying the position of the platform 50 in relation to the metallic material M, and specifically in relation to the surface 19 of the metallic material M. The metallic material M may be referred to as a metal object.

The number of ejectors shown in the arrangement 1 in FIG. 1 is exemplifying. It should be realized that there may be more ejectors in the crack removal unit 40, and that each ejector may be arranged and configured to cover a certain area or width of the metallic material M. Typically each ejector is linked to a corresponding coil arrangement of the crack detecting unit 30 for determining the presence of crack and its crack depth, so as that each associated coil arrangement and ejector form a collaborative group, i.e. a group collaborating in detecting a crack and its crack depth and removing the crack by the ejected carving means 44 in a successive and synchronized activity. For example, the arrangement 1 comprises a coil arrangement 35 to the far left of the crack detecting unit 30, and a coil arrangement 31 to the far right of the crack detecting unit 30.

The position adjusting arrangement 70 comprises a first vertically movable arm 72 or first actuator 72, and a first base 74 comprising e.g. a motor for operating the first actuator 72 on the right hand side of the arrangement 1. The position adjusting arrangement 70 of FIG. 1 further comprises a second vertically movable arm 76 or second actuator 76, and second base 78 comprising e.g., a motor for operating the second actuator 76 on the left-hand side of the arrangement 1. Hereby, at least the vertical distance between the surface 19 of the metallic material M and the platform 50, and the crack detecting unit 30 and crack removal unit 40 may be adjusted in an efficient, and corresponding, manner. According to at least one example embodiment, at least one of the first base 74 and second base 78 is movable in the horizontal plane in order to adjust the position of the platform 50, and the crack detecting unit 30 and crack removal unit 40 horizontally relative the surface 19 of the metallic material M. To clarify, the surface 19 of the metallic material M extends in a horizontal plane, and a vertical direction or vertical distance is perpendicular to such horizontal plane.

The operation of the arrangement 1 will now be further described with reference to the control unit 60. The control unit 60 comprises various sub-units, which in FIG. 1 is embodied by a first unit 62, a second unit 64 and an integration unit 66. The first unit 62 is configured to feed a current to the transmitter coil 32 according to a known schema for generating a magnetic field in the metallic material M. The receiver coil 34 is arranged and configured to detect the magnetic field to generate a signal, and the first unit 62 is configured to receive such signal and process the generated signal to establish the presence of a crack C and its crack depth CD (note that the crack depth CD in FIG. 1 is greatly exaggerated for increased visibility). Upon detection of the crack C during casting, the first unit 62 is configured to send a crack detection signal D including the crack depth CD to the second unit 64 of the control unit 60.

The integration unit 66 is configured to time-integrate a signal from the coil arrangements 31, 35 of the far-right SR and far left SL of the crack detecting unit 30, respectively. Such integrated signals ISR, ISL may be used to determine the distance between the crack detecting unit 30 and the surface 19 of the metallic material M, such as the distance DiR between the right hand side of the crack detecting unit 30 and the surface 19 of the metallic material M, and the distance DiL of the left hand side of the crack detecting unit 30 and the surface 19 of the metallic material M, in the second unit 64. The operation of the position adjusting arrangement 70 can thus be controlled by control signal CtrIR for the distance DiR and control signal CtrIL for the distance DiL, with e.g. the setting of keeping the two distances DiR, DiL constant.

It should be noted that measuring the distance between the crack detecting unit 30 and the surface 19 of the metallic material M may be carried out by only integrating a signal from a single location (and thus not on both the far right and far left sides of the crack detecting unit 19), however by measuring on both the far right and far left sides of the crack detecting unit 30, an improved accuracy of the measured distance is achieved. The measured distance may be used to determine a first distance FD between the ejector 40 and the surface 19 of the metallic material M, based on known inter-related positions of the crack detecting unit 30 and the ejector 42 (or an orifice of the ejector 42). The first distance FD may obviously be varied by means of the position adjusting arrangement 70 as previously described.

The second unit 64 is configured to activate the crack removal unit 40 and the ejector 42 to remove the detected crack C. Moreover, as the crack removal unit 40, and the ejector 42, is configured to vary the intensity of the carving means 44, the second unit 64 may set the intensity of the ejected carving means 44 based on at least the crack depth CD, but typically also the first distance FD. That is, at least the crack depth CD is used as input to the second unit 64, and used to set the intensity of the ejected carving means 44 in response to the crack depth CD. In FIG. 1, the ejector 42 is embodied by a burner 42 configured to eject a flame 44 as carving means. The burner 42 is operated by a gas supply arrangement 80, and the second unit 64 may thus send a control signal CtrIG to the gas supply arrangement 80 to provide a gas supply feed to the burner 42 corresponding to the intensity of the flame 44 required for removing the crack C, i.e. at least based on the crack depth CD, but typically also the first distance FD.

As can be seen in FIG. 1, the metallic material M is moving with a speed v along the motion arrow 2 whereby the crack C will first encounter the crack detecting unit 30 and the coil arrangement 31 therein, and subsequently encounter the crack removal unit 40. Hereby, the presence of a crack C and its crack depth CD can first be determined, and subsequently the crack C can be removed by the crack removal unit 40 in a synchronized and continuous manner. As seen in FIG. 1, the second unit 64 is fed with the speed v of the metallic material M, and may thus calculate timing of the activation of the ejector 42 based on an elapsed time from the crack detection of the crack detection unit 30, determined by the speed v of the metallic material M and the distance KD between the crack detecting unit 30 and the crack removal unit 40. Thus, the crack C will be locally removed from the metallic material M.

The invention will now be described in relation to determination of a crack and its crack depth at an edge E of the metallic material M, and the associated crack removal. As the removal of a crack at the edge E of the metallic material involves the generation of a magnetic field in the metallic material M at the edge E, detecting the magnetic field, and determining characteristic relations of signals pertaining to the detected magnetic field at certain predetermined times, to thereby be able to determine a crack depth, the determination of such crack will first be described in the following, and thereafter the crack removal will be described.

Figure 2A:
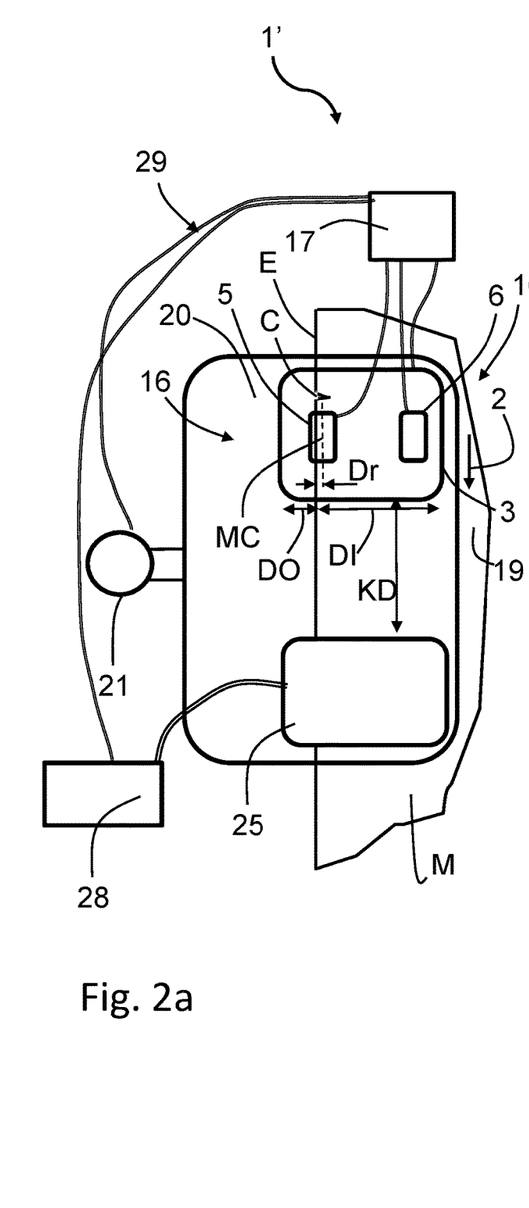
FIGS. 2a and 2b are schematic views of another example of an arrangement for removing a crack in a metallic material during the metal making process.
Figure 2B:
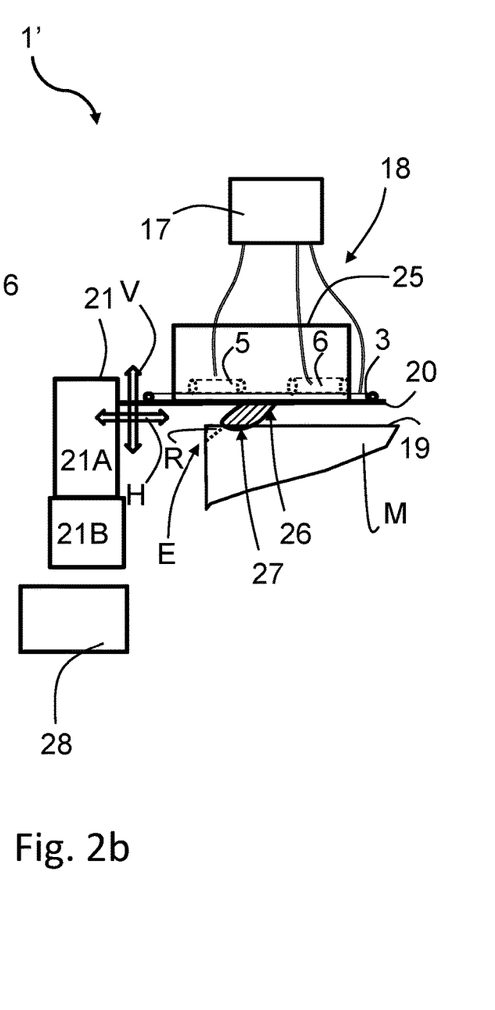

FIGS. 2a and 2b show schematic views of an example of an arrangement 1' for detecting and removing cracks in a surface 19 at and edge E of a metallic material M, e.g. the same metallic material as in FIG. 1. FIG. 2a is a top view and FIG. 2b is a side view. Arrangement 1' of FIGS. 2a and 2b is in principle the same as arrangement 1 of FIG. 1, why mainly the differences between the arrangements are described in the following. For example, the control unit 60, and its first, second and integral units 62, 66, 64 are commonly incorporated in component 17 in FIGS. 2a and 2b, but will be referred to as visualized in FIG. 1 in the following. Component 17 may thus be considered to be a general control unit 17, or general control and computing unit 17. The arrangement 1' comprises crack detecting unit 16 comprising a transmitter coil 3 and a first receiver coil 5 having the same functionality as the transmitter coil 32 and receiver coil 34 described with reference to FIG. 1. Moreover, the crack detecting unit 16 comprises a second receiver coil 6 arranged distant to the first receiver coil 5. The transmitter coil 3, the first and second receiver coils 5, 6 are here commonly referred to as a coil arrangement 18. Even further, the arrangement 1' comprises a platform 20 to which the coil arrangement 18 are connected and movable with. The platform 20 is coupled to a position adjusting arrangement 21 similar to the position adjusting arrangement 70 of FIG. 1 comprising for example an actuator 21A and base 21B, configured to adjust the position of the coil arrangement 18, both vertically V and horizontally H, as indicated in FIG. 2b. It should be noted that the platform 20 is not needed for being able to re-position the coil arrangement 18, but that each of the transmitter coil 3, the first receiver coil 5 and the second receiver coil 6 may be directly coupled to the position adjusting arrangement 21.

Examples of the operation of the arrangement 1' will now be described in more detail with reference to FIGS. 2a, 2b, 3a and 3b. The metallic material M, for instance a hot slab or a hot metal sheet, which is to be inspected for cracks C and subject to crack removal, is placed in the vicinity of the transmitter coil 3 and the first and second receiver coils 5, 6. More specifically, the arrangement 1' is arranged such that the transmitter coil 3 is arranged at least partly outside of the edge E, indicated by the distance DO, and at least partly inside of the edge E, indicated by the distance DI. The ratio of DO/DI is preferably between 0.1 and 0.4. The first receiver coil 5 is in FIGS. 2a and 2b arranged to partly overlap the edge E, such that its magnetic center MC is arranged inside of the edge E. The distance Dr between the edge E and the magnetic center MC is shown in FIG. 2a. The second receiver coil 6 is in FIGS. 2a and 2b fully arranged inside of the edge E, and over the metallic material M. Typically the respective magnetic axis of the transmitter coil 3, and the first and second receiver coils 5, 6 are) perpendicular to the surface 19 of the metallic material M. Preferably, each one of the transmitter coil 3, and first and second receiver coils 5, 6 is a flat coil with a minor propagation along its magnetic axis compared to perpendicularly to its magnetic axis. That is, a minor propagation along the vertical direction compared to the propagation in the horizontal plane.

The metallic material M typically move 2 in relation to the coil arrangement 18 with a certain speed v during crack inspection to thereby enable inspection along the surface 19 of the metallic material M, and to enable successive removal of the crack C, in FIGS. 2a and 2b specifically at the edge E of the metallic material M. As described above, the transmitter coil 3 may be arranged at least partly outside of the edge E, and at least partly inside of the edge E of the metallic material M to overlap the edge E.

The control unit (e.g., shown in FIG. 1 as the first unit 62, incorporated into component 17 of FIGS. 2a and 2b) is configured to provide a control signal to a signal generator (not shown) to thereby control the output signal, e.g. a current, of the signal generator provided to the transmitter coil 3. The signal generator may for instance comprise a transistor which may be controlled by the control unit to be in an open state and thereby provide a current to the transmitter coil or a closed state in which it does not provide a current to the transmitter coil.

Figure 3A:
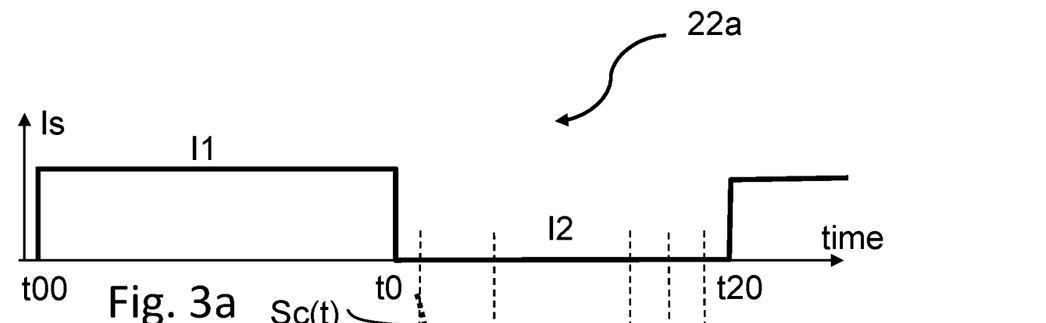
FIGS. 3a and 3b show diagrams of first, second, and third times for determining characteristic relations of a signal detected by the crack detecting unit in the arrangement in FIGS. 2a and 2b.

In one embodiment the control unit is configured to control the signal generator such that the signal generator generates a current which is essentially constant having a first magnitude I1 in a first time span t00-t0, as shown in FIG. 3a.

The process of detecting a crack C at the edge E may be performed as in the following, with reference mainly to FIGS. 3a and 3b: a current with the first magnitude I1 is fed to the transmitter coil 3. A magnetic field is thereby created in the metallic material M at the edge E. During crack inspection, the surface 19 of the metallic material M is arranged sufficiently close to the transmitter coil 3 (e.g., 10-25 mm, or 10-15 mm or 15-25 mm) such that the magnetic field around the transmitter coil 3 is able to penetrate into the metallic material M thus causing the magnetic field in the metallic material M. At a point in time t0 when it is estimated that the magnetic field has penetrated deeper into the metallic material M than the deepest crack depth desired to be measured in the metallic material M, the current fed by the signal generator is controlled by the control unit such that the essentially constant current obtains a second magnitude I2. The second magnitude I2 may for example be essentially zero or zero (i.e., setting the transistor in its closed state). The change of current feed from the first amplitude I1 to the second amplitude I2 causes an induced current to be generated in the metallic material M.

The current which is fed by the signal generator is preferably in the form of a pulse train 22a as shown in the uppermost diagram in FIG. 3a. Measurements of the magnetic field are typically taken between subsequent pulses, as will be elaborated in more detail in the following.

The estimation of when the magnetic field has penetrated deeper into the metallic material M than the deepest crack depth desired to be measured in the metallic material M may be based on theoretical estimation, with the estimated time being programmed in a software in the control unit such that it can control the current output by the signal generator accordingly.

Figure 3B:
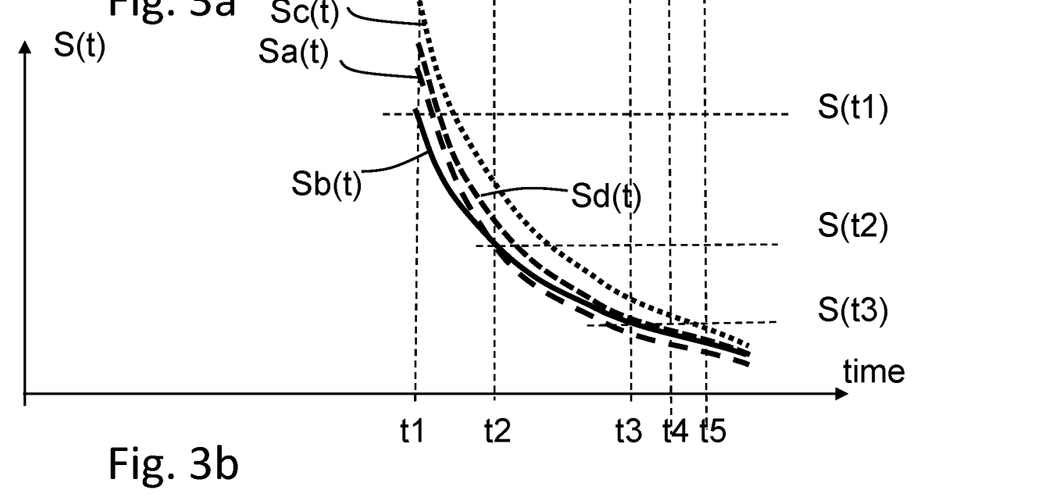

The estimation may be based on when the feeding of the current to the transmitter coil 3 starts, a deepest crack depth desired to be measured, the relative permeability p and electrical resistivity p of the metallic material M. Such estimation may for instance be provided by the following relation:

$$t0-t00 > 1.5 * \mu * (CDmax)2/\rho,$$

where t0 is the time in milliseconds when the current obtains its second magnitude I2, as shown in FIGS. 3a and 3b, t00 is the time when the current obtains its first magnitude I1, CDmax is the maximum crack depth desired to be measured in millimeter, p is the relative permeability of the metallic material M, and p is the electrical resistivity of the metallic material M in nano Ohm meter, nΩm.

The energy in the transmitter coil 3 can quickly be discharged by means of a first resistor (not shown) arranged in a parallel to the transmitter coil 3. Correspondingly, the energy in the first and second receiver coils 5, 6 can be discharge by means of a second and third resistor, respectively. The first resistor is hence arranged and configured to discharge the energy from the transmitter coil 3 when the current has attained its second magnitude I2. When the current has attained its second magnitude I2, the magnetic field created by the induced current is detected by at least the first receiver coil 5. The magnetic field detected by the first receiver coil 5 induces a signal S(t), e.g. a voltage, in the first receiver coil 5 which may be amplified by means of an amplifier. According to the example embodiment of FIGS.

2a and 2b, the magnetic field created by the induced current is also detected by the second receiver coil 6. The magnetic field detected by the second receiver coil 6 also induces a signal, Sr(t), e.g. a voltage, in the second receiver coil 6 which may be amplified by means of an amplifier.

The amplifier(s) provides the amplified signal from at least the first receiver coil 5 to a computing arrangement (for example incorporated into the first unit 62 of the control unit 60, shown in FIGS. 2a and 2b as component 17). The computing arrangement is in one embodiment configured to determine a first signal value St1, a second signal value St2 and a third signal value St3, respectively, of the signal. In one embodiment component 17 is configured to provide control signals to the first unit 62 for the first unit 62 to be able to determine the first signal value St1 at a first time t1, the second signal value St2 at a second time t2 and the third signal value St3 at a third time t3, as shown in FIGS. 3a and 3b.

Prior to, or concurrently with the detection of the magnetic field by the first receiver coil 5, and optionally the detection of the magnetic field by the second receiver coil 6, the energy created in the first receiver coil 5 by the magnetic field is discharged by means of the second resistor, and the energy created in the second receiver coil 6 by the magnetic field is discharged by means of the third resistor. The second and third resistors are hence arranged and configured to discharge the energy from the first and second receiver coils 5, 6, respectively, when the current has attained its second magnitude I2. In one embodiment the second resistor is arranged in parallel connection with the first receiver coil 5, and/or the third resistor is arranged in parallel connection with the second receiver coil 6.

By means of proper selection of resistance of the first resistor, the second resistor and the third resistor, a fast switching between the first magnitude I1 and the second magnitude I2 of the current, a fast discharge of the energy in the transmitter coil 3 and the first and second receiver coils 5, 6 may be achieved, thus allowing for a short time span t1-t0 before commencement of magnetic field measurements by means of the first and second receiver coils 5, 6.

The first time t1 is in one embodiment at a time (from t0) at which it has been estimated that any disturbances due to control of the current to obtain the second magnitude I2 have ceased, and optionally that the induced current in the metallic material M due to control of the current to obtain the second magnitude I2 has penetrated deeper in the metallic material M than a depth corresponding to surface irregularities of the metallic material M and shallow crack depths not desired to be measured. Estimation of the time when the current has penetrated to a depth deeper than surface irregularities of the metallic material M and shallow crack depths not desired to be measured may be provided by the following relation in case crack depths and surface irregularities having a depth of less than or equal to 1 mm are not desired to be measured:

$$t1 \approx 800 * \mu / \rho,$$

where t1 is the time in microseconds, $\mu$ is the relative permeability of the metallic material M, and $\mu$ is the electrical resistivity in nom. Similar equations can be derived depending on the minimum crack depth desired to be measured. For example, measuring on high electrical resistivity material, such as hot steel (e.g., steel at 1000° C.), the time of decay should be less than around 1 microsecond and the time t1 is thus selected to be 1 microsecond, or between 0.5-1 microsecond (after t0). For low resistivity material, significantly longer setting of the first time t1 can be used, e.g. according to the simplified equation:

$$t1 = 30/(\rho^{1/2})$$

where $\rho$ is the electrical resistivity of the metallic material M in nano Ohm meter, nΩm, and t1 is in microseconds.

The third time t3 is in one embodiment at a time (after t0) at which it has been estimated that any influence of a change in radius R of the curvature of the edge E has ceased. For example, the third time t3 may for measuring on high electrical resistivity material, such as hot steel (e.g. steel at 1000° C.) be around 12 microseconds (e.g. with a radius R of the edge E of 2 mm). For another material, the third time t3 can be set to:

$$t3 = 12 * (1000/\rho)^{1/2}$$

where p is the electrical resistivity of the metallic material M in nano Ohm meter, nΩm, and t3 is in microseconds.

T The second time t2 is chosen at some time between the first time t1 and the third time t3. For example, the second time t2 can be chosen at a time (after t0):

$$t2 = (((t1)^{1/2} + (t3)^{1/2})/2)^2$$

Each of the first, second and third times described herein are typically programmed in the software of the component 17, which can provide control signals to the computing arrangement, e.g. the first unit 62 to determine the first signal value St1, the second signal value St2, and the third signal value St3.

For the first, second and third times t1, t2, t3 the respective first signal value St1, second signal value St2 and third signal value St3 are determined by means of the computing arrangement, for instance by the first unit 62. The first signal value St1 is typically a single signal value of the signal taken at the first time t1, but may also be a mean value of the signal in a first time range extending from −30% of t1 to +30% of t1, or an integration of the signal in the first time range. Correspondingly, the second signal value St2 is typically a single signal value of the signal taken at the second time t2, but may also be a mean value of the signal in a second time range extending from −30% of t2 to +30% of t2, or an integration of the signal in the second time range. Finally, the third signal value St3 is typically a single signal value of the signal taken at the third time t3, but may also be a mean value of the signal in a third time range extending from −30% of t3 to +30% of t3, or an integration of the signal in the third time range.

The first, second and third signal values St1, St2, St3 may be subject to further signal processing and may be provided in the form of an analog signal as a voltage by means of a sample-and-hold circuit configured in the component 17, or alternatively as a digital signal by means of an A/D-converter configured in the component 17.

The first, second and third signal values St1, St2, St3 may be subject to further signal processing at a fourth time t4 which is after the third time t3 but prior to the time t20 in which the measurement is repeated and a new current pules is generate by the signal generator, wherein the first unit 62 can be reset at a fifth time t5 after the fourth time t4, for a subsequent measurement, i.e. a determination of signal values of a subsequent current pulse. This is shown in the lowermost diagram in FIG. 3b. Thus, a current pulse may at a time t20 be fed by the signal generator to the transmitter coil 3, wherein the measurement is repeated.

Subsequently, it is determined whether a crack is present by determining the crack depth based on the on the first, second and third signal values St1, St2, St3. The determination of the crack depth can be performed in component 17 by means of determining a characteristic relation between at least two of the following combinations of signal values: the first signal value St1 and the second signal value St2; the second signal value St2 and the third signal value St3; and the first signal value St1 and the third signal value St3. The combination of characteristic relations, e.g. St1/St2 and St1/St3, or St2/St3 and St1/St3 or St1/St2, are independent of the position of the edge and the radius of the curvature of the edge, which will be further explained below. As a note, the resistivity of the material is substantially constant during the detection of the crack, and the irregulates of the surface of the metallic material does not affect the measurement with regards to the characteristics of the first time t1.

Turning to FIG. 3b, the determination of a crack and its crack depth CD is performed by comparing the characteristic relations with corresponding characteristic relations of reference signals. In FIG. 3b, a first reference signal Sa(t) has been established (theoretically or by the measurement as described above, in which a crack C is present at the edge E of the metallic material M. The position of the edge E compared to a reference position, here the magnetic center MC of the first receiver coil 5, and the radius R of the curvature of the edge E may correspondingly be determined by an edge position parameter and a radius parameter, respectively. Thus, and according to at least one example embodiment, the edge position parameter represents, or corresponds to, the position of the edge relative a reference position, and the radius parameter represents, or corresponds to, the radius of the curvature of the edge. The edge position parameter and the radius parameter are for the first reference signal Sa(t) representing a normal condition, corresponding to a first edge reference value of the edge position parameter and a first reference value of the radius parameter. Moreover, the following reference signals are established and presented in FIG. 3b: a second reference signal Sb(t) for the same metallic material having no cracks, and with the same radius parameter and edge position parameter (i.e. the first radius reference value and the first edge reference value, respectively); a third reference signal Sc(t) for the same metallic material having no cracks, and with the same radius parameter (i.e. the first radius reference value) but a predetermined change of the edge position parameter relative the first edge reference value; and a fourth reference signal Sd(t) for the same metallic material having no cracks, and with the first edge reference value as edge position parameter, and a predetermined change of the radius parameter relative the first radius reference value. Thus, all of the reference signals are based theoretically calculations, or on the measurement as presented above but for more times than t1, t2 and t3 in order to achieve continuous curves.

The independency of the position of the edge may thus be performed by the following characteristic relations of the first, second and third signal values St1, St2, St3 for example by performing the following procedure and calculations.

First, the following characteristic relations of the second and third reference signals Sb(t), Sc(t) are set up for the first, second and third times, t1-t3:

$Sb(t1)/Sb(t2)=Sc(t1)/Sc(t2)$, and $Sb(t2)/Sb(t3)=Sc(t2)/Sc(t3)$.

Based on the above characteristic relations, the position of the edge will thus not disturb the measurement.

Sb(t1)/Sb(t2) and Sc(t1)/Sc(t2) may subsequently be multiplied with a constant factor N12 in order to make such product equal to one (1) when there is no crack present in the metallic material, and with the first radius reference value for the radius parameter. Correspondingly, Sb(t2)/Sb(t3) and Sc(t2)/Sc(t3) may be multiplied with a constant factor N23 in order to make such product equal to one (1) when there is no crack present in the metallic material, and with the first radius reference value for the radius parameter. Thus, the following relations can be set up:

$N12*Sb(t1)/Sb(t2)-1=N12*Sc(t1)/Sc(t2)-1=0;$ $N23*Sb(t2)/Sb(t3)-1=N23*Sc(t2)/Sc(t3)-1=0.$

Thus, during a measurement S(t) as described above, the following equations are set up:

$R12=N12*S(t1)/S(t2)-1$ $R23=N23*S(t2)/S(t3)-1$

Deviations from zero (0) of R12 and R23 thus indicate a change of the radius of the curvature of the edge and/or the presence and depth of a crack, independent of the position of the edge.

N12 and N23 can be determined by measurements on a reference metallic material with the same or similar electric and magnetic properties as the metallic material subject to the measurement.

As is further clear from FIG. 3b, there is a considerable difference in the first reference signal Sa(t) and the fourth reference signal Sd(t) between the first time t1 and the second time t2, at least compared to a difference between the same reference signals Sa(t), Sd(t) between the second time t2 and the third time t3. Thus, R12 will result in a relative larger difference to R23 for Sa(t) compared to R12 relative R23 for Sd(t). Based on this fact, a characteristic number CR can be determined which is independent of the edge position and the radius of the curvature of the edge:

$CR=R12-Const1*R23$

Const 1 can be determined e.g., based on measurements on a reference material as described above including a predetermined change of the radius parameter relative the first radius reference value, and in which CR=0 for such radius changes, or it can be determined on the metallic material subject to the crack measurement but on a portion with no cracks present, and a value of Const1 giving minimal measurement variations during the measurement. That is, the value of Const1 is selected as to give minimum variations of CR when radius R of the edge is varying. For example, if the second time t2 is determined by the above equation $t2=(((t1)^{1/2}+(t3)^{1/2})/2)^2$, Const1 is equal to, or approximately equal to, one (1).

For example, by performing the method as described above, steps S10-S60, and acknowledging that CR=0 for Sd(t) (that is Const1=R12/R23), Const1=0.91, and that Sb(t1)=1, the following resulting table based on FIG. 3b could be set up:

TABLE 1

|  | t1 | t2 | t3 | N12(=t2/t1) | N23 | R12 | R23 | CR |
|---|---|---|---|---|---|---|---|---|
| Sb(t) | 1 | 0.5 | 0.25 | 0.5 | 0.5 | 0 | 0 | 0 |
| Sc(t) | 1.5 | 0.75 | 0.375 | 0.5 | 0.5 | 0 | 0 | 0.0000 |

TABLE 1-continued

|  | t1 | t2 | t3 | N12(=t2/t1) | N23 | R12 | R23 | CR |
|---|---|---|---|---|---|---|---|---|
| Sd(t) | 1.2 | 0.55 | 0.25 | 0.5 | 0.5 | 0.090909 | 0.1 | −0.0001 |
| Sa(t) | 1.15 | 0.5 | 0.23 | 0.5 | 0.5 | 0.15 | 0.086957 | 0.0709 |

Thus, a deviation of CR from zero (0) indicates the presence of a crack (acknowledging that the value −0.0001 is approximately zero).

The crack depth, CD can subsequently be determined by the following relation:

$$CD = Const2 * CR + Const3$$

where Const2 and Const3 can be determined by e.g. measurements on a reference material as described above including cracks with different crack depths, or can be determined theoretically. For example, for hot steel (steel at 1000° C.), and times t1-t3 as described above, Const2 will be around 100 and Const3 around 1 mm.

According to at least one example embodiment, the first and second receiver coils 5, 6 are used to determine the position of the edge E, horizontally (i.e., along, or parallel, to the surface 19 of the metallic material) relative the arrangement 1', and the vertical distance between the surface 19 of the metallic material M and the arrangement 1', as described in the following. The two (amplified) time dependent signals S(t), Sr(t) as described above, i.e. for the first receiver coil 5 being S(t) and for the second receiver coil 6 being Sr(t), are fed to component 17. Here, both signals S(t) and Sr(t) are separately integrated from time t0 to time t1 in a corresponding manner as the right and left side distances, DiR and DiL, for FIG. 1 and integration unit 66. The two integrated values of S(t140) and Sr(t140) (i.e. $\int_{t0}^{t1} S(t)$ and $\int_{t0}^{t1} Sr(t)$), and the relation thereof, are used to determine the horizontal position of the edge E relative the arrangement 1' and the vertical distance between the surface 19 of the metallic material M and the arrangement 1'. In more detail, as the first receiver coil 5 is arranged relative close the to the edge E, the integrated value of S(t140) will depend on both the vertical distance between the first receiver coil 5 and the surface 19 of the metallic material, as well as the horizontal distance between the first receiver coil 5 (e.g. the magnetic centre MC) and the edge E, while the integrated value of Sr(t140) will depend only on the vertical distance between the second receiver coil 6 and the surface 19 of the metallic material (as the second receiver coil 6 is arranged distant from the edge E). Thus, the position, or horizontal distance PHor, of the edge E and the vertical distance PVer to the surface 19 of the metallic material M, in relation to the arrangement 1', or coil arrangement 18, can be determined by the ratio Sr(t1-t0)/S(t1-t0). For example, by measuring on a reference material as PHor and PVer is varied (e.g., over a plurality of steps a 1 mm), the ratio:

$$\int_{t0}^{t1} Sr(t) / \int_{t0}^{t1} S(t)$$

can be determined and the relations of PHor and PVer can be determined based on e.g., the magnetic center of the transmitter coil.

For the above-mentioned measurement, the first receiver coil 5 is for example arranged with horizontal distance from the edge E to the magnetic centre MC approximately half the vertical distance between the surface 19 of the metallic material and the first receiver coil 5. The second receiver coil 6 is for example arranged with a horizontal distance from the edge E to a magnetic centre of the second receiver coil 6 which is larger than the vertical distance between the surface 19 of the metallic material and the second receiver coil 6.

Thus, the position adjusting arrangement 21 can move the platform 20 in response to the measurement of PHor and PVer, and be configured to keep PHor and PVer constant during the measurement. For large variations ins PHor and PVer (e.g. +/−3-5 mm), the measurement independency of the position of the edge and radius of the curvature of the edge may not be fulfilled. Thus, according to at least one example embodiment, the measurement independency of the position of the edge and radius of the curvature of the edge is valid for variations of PHor and PVer<+/−3 mm.

It should be understood that for embodiments having only the first receiver coil 5, it is still possible to establish an edge position parameter based on the position of the edge relative a reference position, i.e. a horizontal distance from the edge E and e.g. the magnetic centre MC of the first receiver coil 5 and to establish a radius parameter based on the radius R of the curvature of the edge E. The previously described characteristic relations are adapted to be independent of the edge position parameter and the radius parameter. However, for the absolute values of the PHor and PVer, both the first and second receiver coils 5, 6 are needed.

Crack at an edge in a metallic material, should be interpreted as a crack present in the close vicinity of the edge, e.g. a crack intersecting a geometrical diagonal axis of 45° originating from the edge into the metallic material, or a crack extending from the horizontal surface of the metallic material to the lateral, vertical, surface of the metallic material. The crack depth CD may according to one example embodiment be the distance from the surface of the metallic material to a point where the crack intersects with the geometrical diagonal axis of 45°. The measurement of a crack at the edge E is here embodied by providing the transmitter coil 3 at least partly outside of the edge E of the metallic material M, and preferably overlapping so DO/DI is between 0.1-0.4. Moreover, it should be noted that the curvature of the edge need not to be round, but way as well be edgy. In such cases, a hydraulic radius or equivalent radius may be used instead of the radius presented herein.

The removal of the crack C at the edge E will now be described in more detail with reference to FIGS. 2a and 2b.

The arrangement 1' of FIGS. 2a and 2b comprises a crack removal unit 25 arranged at a known distance KD from the crack detecting unit 16. The crack removal unit 25 comprises at least one ejector 26 configured to eject a carving means 27 correspondingly to the arrangement 1 of FIG. 1. In the example embodiment of FIGS. 2a and 2b, the crack detecting unit 16 and the crack removal unit 25 are arranged on the common platform 20, and a control unit 60 as that of FIG. 1 is assumed incorporated into component 17, with the same functionality, for comprehensibility reasons. Moreover, the ejector 26 may be a burner configured to eject a flame as carving means 27, similar to the arrangement 1 of FIG. 1, and thus coupled to a corresponding gas supply means 28, which description is not repeated here again. As seen in FIG. 2a, the crack removal unit 25 is arranged partly outside of an edge E of the metallic material M, for enabling removal of the crack. Suitable connection and wiring means 29 are schematically indicated in FIG. 2a, but not in FIG. 2b.

Figure 4:
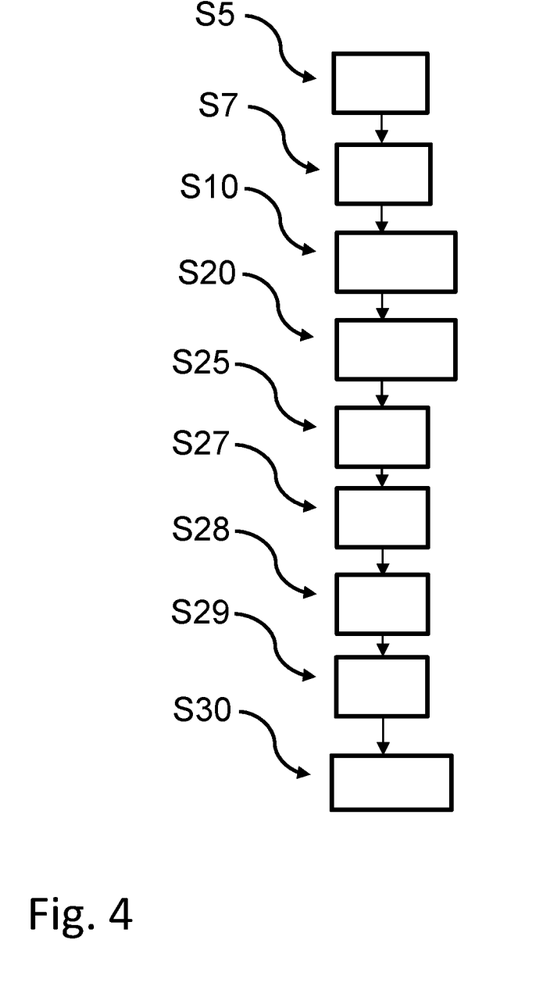
FIG. 4 is a flowchart of a method of removing a crack in a metallic material during the metal making process.

A method for removing a crack C in a metallic material M by the arrangement 1 of FIG. 1 or arrangement 1' of FIGS. 2a and 2b will now be described with reference to the flow chart of FIG. 4.

In step S10, the presence of a crack C and its crack depth CD during a metal making process is determined by a crack detecting unit utilizing inductive measurement. In an optional step S7, the crack detecting unit and the crack removal unit are arranged along the same operational line of the metallic material. Moreover, the distance between the crack detecting unit and crack removal unit can be kept constant during the process of crack removal.

The crack detecting unit may e.g., be arranged and configured to determine a crack at the edge E of the metallic material M as described with reference to FIGS. 2a and 2b, or distant to the edge E of the metallic material M as described with reference to FIG. 1. Thus, in an optional step S5, the crack detecting unit is provided or arranged partly outside of the edge of the metallic material for detecting a crack and its crack depth at the edge. As shown in FIGS. 2a and 2b, the crack removal unit is correspondingly arranged at the edge to remove any detected crack in this region. For such crack detection and crack removal at the edge of the metallic material, the position of the edge relative a reference position of the arrangement 1' may be determined in a step S28, and the position of the crack detecting unit and the crack removal unit can be adjusted in a step S29 so as to keep the relative distance between the edge and the crack detecting unit, and the distance between the edge and the crack removal unit constant during the process of crack removal.

In a step S20, a crack detection signal D and crack depth CD is sent to a crack removal unit arranged on known distance from the crack detecting unit. The crack removal unit comprises an ejector configured to eject a carving means, and to vary the intensity of the ejected carving means. The ejector may be a burner and the ejected carving means may be a flame as described with reference to FIG. 1. Typically, the distance between the crack detecting unit and crack removal unit are held constant during the process of crack removal.

In a step S30, the detected crack is removed by activating the ejector based on the crack detection signal with an intensity of the ejected carving means based at least on the crack depth.

The intensity of the ejected carving means may additionally be determined by a first distance between the ejector and the surface of the metallic material. Thus, in an optional step S25, the first distance between the surface of the metallic material and the ejector of the crack removal unit is determined. The step S30 of removing the detected crack during the metal making process may thus comprise setting the intensity of the ejected carving means based at least on the crack depth and the first distance. The first distance is e.g., shown in FIG. 1.

In an optional step S27, the first distance between the surface of the metallic material and the ejector of the crack removal unit is adapted.

The inventive concept has mainly been described above with reference to a few embodiments. However, as is readily appreciated by a person skilled in the art, other embodiments than the ones disclosed above are equally possible within the scope of the invention, as defined by the appended claims. Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. The order of the method steps described in the present disclosure is not constrained to that described in FIG. 4. One or several of the steps could switch places, or occur in a different order without departing from the scope of the invention. However, according to at least one example embodiment, the method steps are performed in the consecutive order described in FIG. 4.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An arrangement for removing a crack in a metallic material during a hot metal making process comprising:
a crack detecting unit including a transmitter coil and at least one receiver coil,
a crack removal unit arranged at a known distance from the crack detecting unit, the crack removal unit including at least one ejector configured to eject a carving means and to vary an intensity of the ejected carving means,
a control unit configured to feed a current to the transmitter coil according to a known schema for generating a magnetic field in the metallic material, detect the magnetic field via the receiver coil to generate a signal, and process the generated signal to determine the presence of a crack and a crack depth of the crack, wherein upon detection of the crack during the metal making process, the control unit is configured to send a crack detection signal and the crack depth to the crack removal unit for activating the ejector to remove the crack and setting the intensity of the ejected carving means based at least the crack depth,
wherein the control unit is configured to determine a first distance between the ejector and a surface of the metallic material, and wherein the control unit is configured to set the intensity of the ejected carving means based at least on the crack depth and said first distance.

2. The arrangement according to claim 1, the crack detecting unit and the crack removal unit are arranged along the same operational line of the metallic material.

3. The arrangement according to claim 1, wherein the control unit is configured to calculate timing of the activation of the ejector based on an elapsed time from the detection of the crack by the crack detecting unit, determined by a speed of the metallic material and a distance between the crack detecting unit and the crack removal unit.

4. The arrangement according to claim 1, further comprising a position adjusting arrangement configured to adjust a position of the crack detecting unit and/or the crack removal unit in relation to the metallic material.

5. The arrangement according to claim 4, wherein the position adjusting arrangement is configured to keep a distance between the crack detecting unit and the crack removal unit constant during the process of crack removal.

6. The arrangement according to claim 1, wherein the crack detecting unit and the crack removal unit share a common platform.

7. The arrangement according to claim 1, wherein the crack detecting unit is configured to be arranged such that the transmitter coil is arranged partly outside of an edge of the metallic material, for enabling detection of a crack and corresponding crack depth at the edge.

8. The arrangement according to claim 7, wherein the control unit is configured to determine a position of the edge relative a reference position.

9. The arrangement according to claim 8, further comprising a position adjusting arrangement, which is configured to adjust a position of the crack detecting unit and a position of the crack removal unit to keep the relative distance between the edge and the crack detecting unit, and the distance between the edge and the crack removal unit constant during the process of crack removal.

10. The arrangement according to claim 1, wherein the ejector is a burner configured to eject a flame as the carving means, and wherein a varying gas supply feed to the burner provides variation of the intensity of the flame.

11. The arrangement according to claim 1, wherein the metallic material is a hot slab discharged from a continuous casting machine.

12. The arrangement according to claim 1, wherein the hot metal making process indicates a temperature of the metallic material at least 500° C.

13. The arrangement according to claim 12, wherein the hot metal making process indicates the temperature of the metallic material at least 750° C.

14. The arrangement according to claim 1, wherein the crack removal unit is configured to remove the crack during the hot metal making process prior to cooling the metallic material.

15. The arrangement according to claim 1, wherein the crack detecting unit is configured to detect the presence of the crack and the crack depth in a contactless manner with the metallic material.

16. The arrangement according to claim 1, wherein the ejector is configured to adapt the ejected carving means so that the ejected carving means carves into the metallic material at the crack to a depth corresponding to that of the determined crack depth.

17. The arrangement according to claim 1, wherein the crack removal unit is configured to adapt a time of keeping the ejector activated based on a length of the crack.

18. An arrangement for removing a crack in a metallic material during a hot metal making process comprising:
   a crack detecting unit including a transmitter coil and at least one receiver coil,
   a crack removal unit arranged at a known distance from the crack detecting unit,
   the crack removal unit including at least one ejector configured to eject a carving means and to vary an intensity of the ejected carving means,
   a control unit configured to feed a current to the transmitter coil according to a known schema for generating a magnetic field in the metallic material, detect the magnetic field via the receiver coil to generate a signal, and process the generated signal to determine the presence of a crack and a crack depth of the crack, wherein upon detection of the crack during the metal making process, the control unit is configured to send a crack detection signal and the crack depth to the crack removal unit for activating the ejector to remove the crack and setting the intensity of the ejected carving means based at least the crack depth,
   wherein the control unit is configured to determine a first distance between the ejector and a surface of the metallic material, and wherein the control unit is configured to set the intensity of the ejected carving means based at least on the crack depth and said first distance, and
   wherein the crack detecting unit and the crack removal unit are attached to a common platform such that the crack detecting unit and the crack removal unit are arranged along the same operational line of the metallic material.

19. An arrangement for removing a crack in a metallic material during a hot metal making process comprising:
   a crack detecting unit including a transmitter coil and at least one receiver coil,
   a crack removal unit arranged at a known distance from the crack detecting unit, the crack removal unit including at least one ejector configured to eject a carving means and to vary an intensity of the ejected carving means,
   a control unit configured to feed a current to the transmitter coil according to a known schema for generating a magnetic field in the metallic material, detect the magnetic field via the receiver coil to generate a first signal, and process the generated first signal to determine the presence of a first crack and a first crack depth of the first crack, wherein upon detection of the first crack during the metal making process, the control unit is configured to send a first crack detection signal and the first crack depth to the crack removal unit for activating the ejector to remove the first crack and setting the intensity of the ejected carving means based at least the first crack depth,
   wherein the control unit is configured to determine a first distance between the ejector and a surface of the metallic material, and wherein the control unit uses the first crack depth and said first distance as input to adjust the intensity of the ejected carving means provided by the ejector for removing the first crack,
   the control unit configured to detect the magnetic field via the receiver coil to generate a second signal and process the generated second signal to determine the presence of a second crack and a second crack depth of the second crack, the second crack depth being different than the first crack depth, wherein upon detection of the second crack during the metal making process, the control unit is configured to send a second crack detection signal and the second crack depth to the crack removal unit for activating the ejector to remove the second crack and setting the intensity of the ejected carving means based at least the second crack depth,
   wherein the control unit uses the second crack depth and said first distance as input to adjust the intensity of the ejected carving means provided by the ejector for removing the second crack, wherein the intensity for removing the second crack is different from the intensity for removing the first crack.

* * * * *